Figure 1:
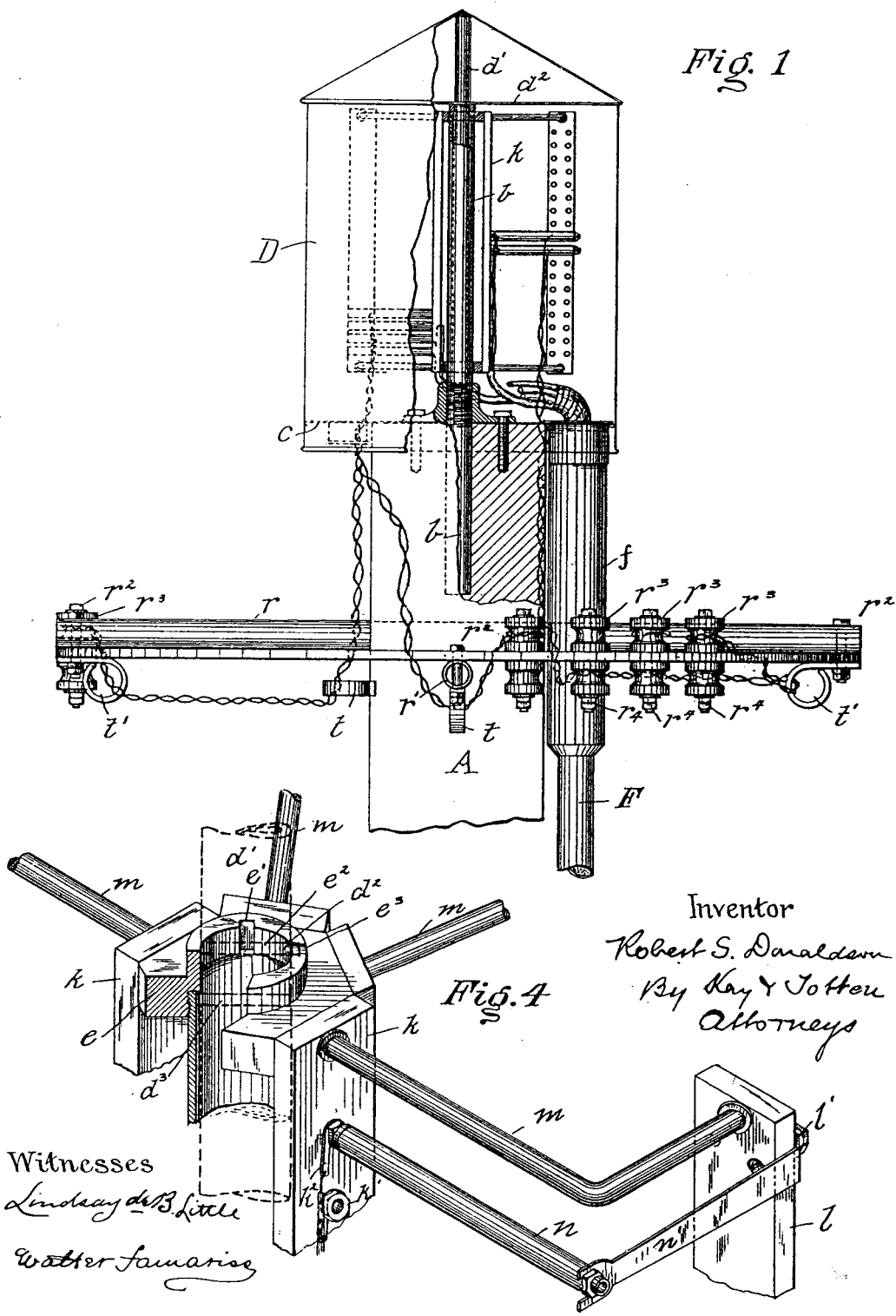

No. 623,771. Patented Apr. 25, 1899.
R. S. DONALDSON.
DISTRIBUTING TERMINAL.
(Application filed Aug. 1, 1898.)
(No Model.) 4 Sheets—Sheet 3.
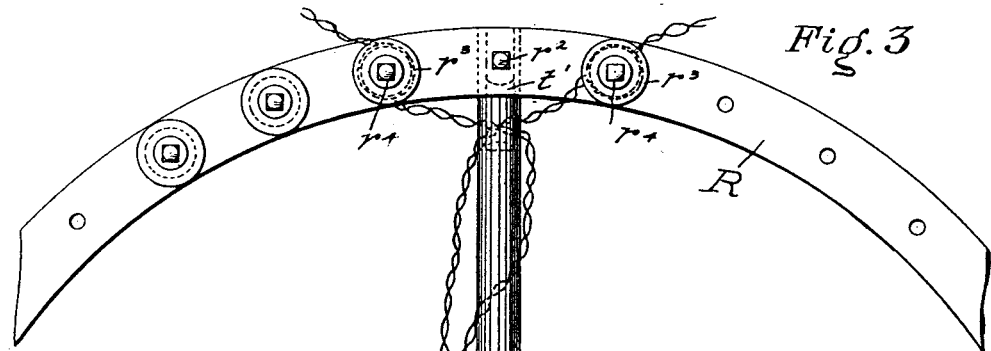
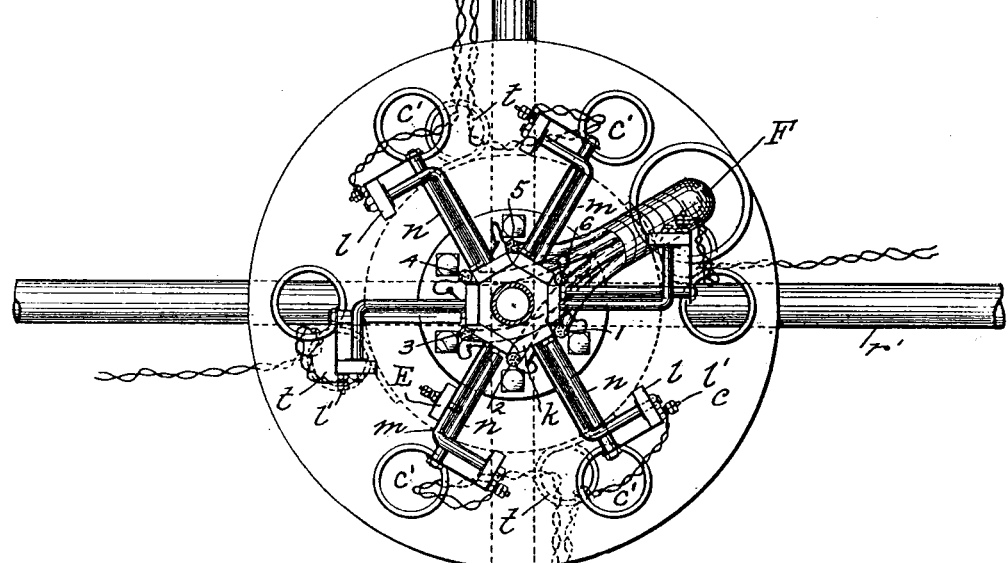
Fig. 3
Witnesses
Lindsay B. Little
Walter Samaries
Inventor
Robert S. Donaldson
By Kay & Totten
Attorneys No. 623,771.  
R. S. DONALDSON.  
DISTRIBUTING TERMINAL.  
(Application filed Aug. 1, 1898.)  
Patented Apr. 25, 1899.

(No Model.)  
4 Sheets—Sheet 4.

Witnesses  
Lindsay deB. Little  
Walter Samaries

Inventor  
Robert S. Donaldson  
By Kay & Totten  
Attorneys

UNITED STATES PATENT OFFICE.

ROBERT S. DONALDSON, OF PITTSBURG, PENNSYLVANIA.

DISTRIBUTING-TERMINAL.

SPECIFICATION forming part of Letters Patent No. 623,771, dated April 25, 1899.

Application filed August 1, 1898. Serial No. 687,423. (No model.)

*To all whom it may concern:*

Be it known that I, ROBERT S. DONALDSON, a resident of Pittsburg, in the county of Allegheny and State of Pennsylvania, have invented a new and useful Improvement in Distributing-Terminals; and I do hereby declare the following to be a full, clear, and exact description thereof.

My invention relates to distributing-terminals for electric wires.

In the present system of employing underground cables it is necessary to carry the different cables aboveground and to suitable terminals from which the wires can be distributed out to different points in the localities—such, for example, in the use of telephone-wires to different telephones located within a certain radius—and in some cases where the wires are carried overhead cables carrying a number of wires are employed for this purpose and are either carried to such distributing-terminals or smaller terminals, or junction-boxes are employed, a few wires being tapped or carried off from the main cable, whether it is underground or overhead, and carried to such junction-box, and the wires of the cable separated therein in order to distribute them to the different telephones or other places to or from which current is to be carried.

The object of the present invention is to provide a cheap and compact distributing-terminal which provides for easy access to the wires, proper distribution of the same from the terminal in any direction desired, the support of fuses if they are required in such position that they can be easily removed and replaced, and as one important element the protection of the entire terminal from moisture by inclosing it in a case which can be quickly opened to give access to the terminal and yet will afford full protection to the same.

To these ends my invention comprises, generally stated, an electric terminal having a central standard and a series of terminal-supports arranged radially around such standard, such terminal-supports comprising when necessary supports for fuses so arranged as to hold the fuse extending out in substantially radial position from the inner support, and in this way to provide for easy access to the fuse itself and to the terminal-supports and the clips carried thereon both for the incoming or cable wires and for the outgoing or line wires, as may be found necessary.

The invention further comprises proper distributing means for the incoming and the outgoing wires entering and extending away from the terminal system, as hereinafter fully described, and, further, an inclosing case or cover arranged to be raised and expose the entire system or to properly inclose and protect the same, while a distributing-ring supporting the insulators and giving support to the workman when connecting up or repairing the distributing-terminal is provided, the same being supported in peculiar way by the telegraph-pole.

The particular improvements desired to be covered will be hereinafter more fully set forth and claimed.

To enable others skilled in the art to make and use my invention, I will describe the same more fully, referring to the accompanying drawings, in which—

Figure 2:
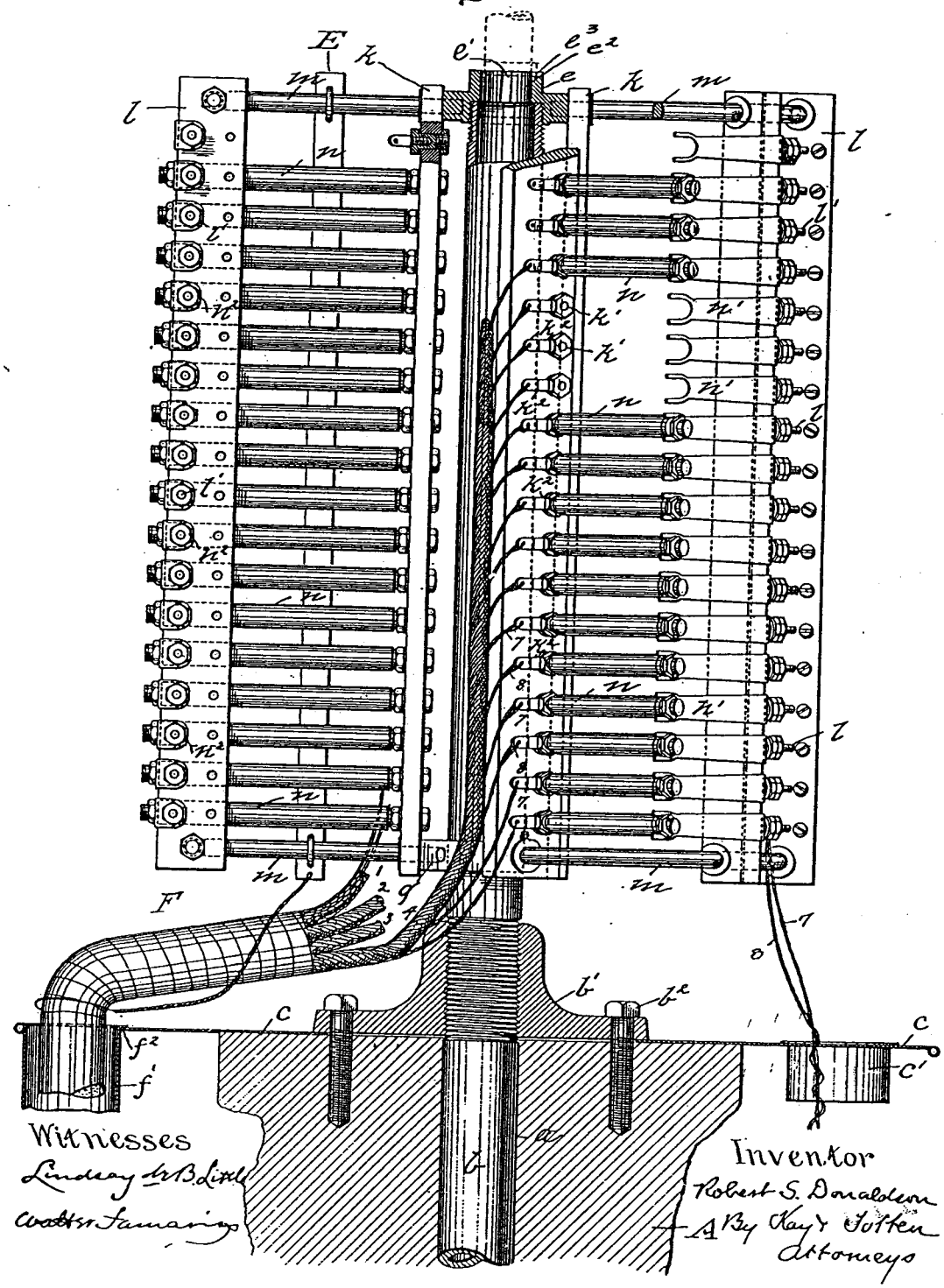
Figure 5:
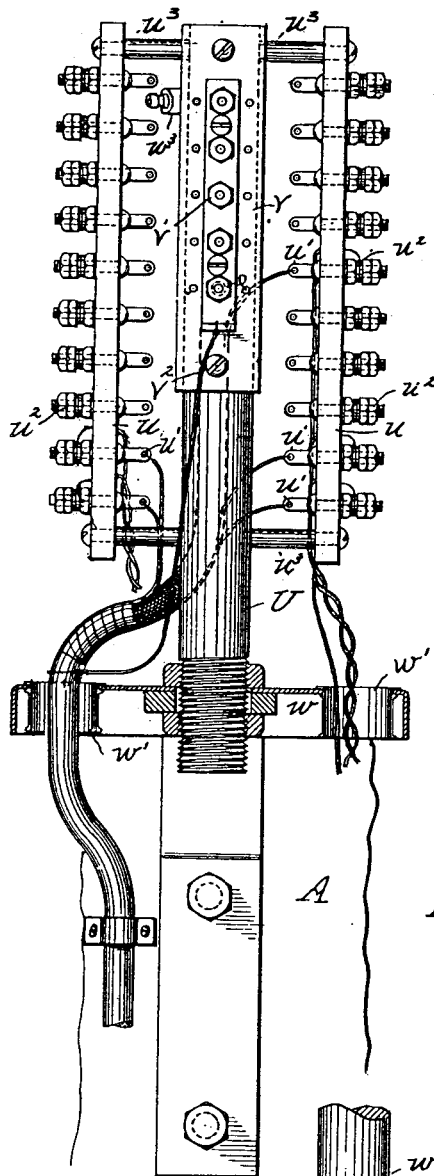
Figure 6:
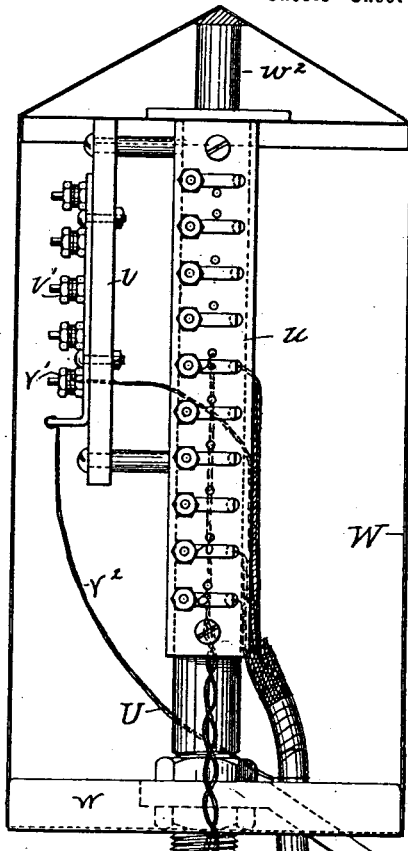
Figure 8:
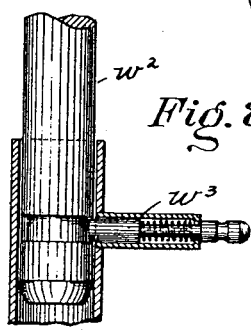
Figure 7:
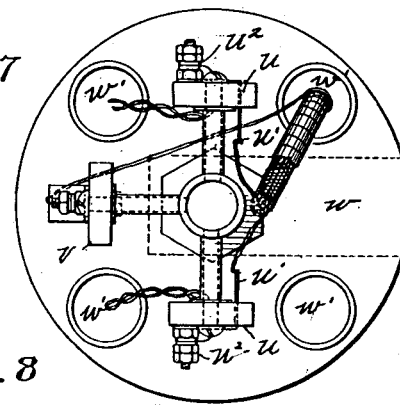

Figure 1 is a side view, partly broken away, illustrating the terminal. Fig. 2 is an enlarged side view, partly broken away, illustrating more fully the distributing-terminal, the cover or cap being removed, and the method of carrying the wires to and from the same being shown. Fig. 3 is a top or plan view, the cover being removed so as to illustrate more fully the way of carrying the wires to and from the same. Fig. 4 is a detail perspective of the upper end of Fig. 1. Figs. 5, 6, and 7 are views of a junction-box or terminal embodying to some extent the improvement as applied to such junction-box, and Fig. 8 is a detail of the upper end of Fig. 7.

Like letters and figures indicate like parts in each of the views.

As my invention is to be particularly employed in connection with distributing-terminals where a single cable is carried up from an underground conduit to the terminal to be distributed therefrom, I will describe it more particularly in that connection.

The telegraph-pole A has the top face thereof sawed off to form a substantially horizontal top for the support of the terminal, and a hole is bored centrally into the same to receive and give support to the central tube *b*, which forms the standard of the terminal, this tube passing down into the hole of the pole and extending above the same a sufficient distance to form the central standard of the terminal. In order to secure the parts in proper position, as shown in Fig. 1, two sections forming the tube $b$ are screwed into the bearing $b'$, which is secured upon the top of the pole by suitable bolts $b^2$, said bearing acting to clamp in position a disk or base-piece $c$, which forms the bottom of the inclosing case. The cover D of this inclosing case is made of sufficient size to inclose the whole of the terminal, and it has the central shaft or bar $d'$ secured at the upper end thereof and passing down through the hollow standard or tube $b$, the cross-brace $d^2$ of the cover resting on the top of the standard and so giving support to the cover, which extends down to the disk $c$ and with it incloses the entire distributing system. The bar $d'$ (shown in dotted lines, Fig. 4) is made of such length that it extends down practically to the base of the tube or standard $b$, and at a point somewhat above the base of the bar $d'$ are formed lugs $d^2 d^3$, which form a bayonet-joint connection with the spider-head $e$, forming the top of the standard $b$, the spider-head screwing onto the standard $b$ and having a suitable groove or keyway $e'$ in its inner face through which such lugs may pass, it being noted that the passage $e^2$ through the spider-head is slightly smaller than the bore of the standard $b$, so that the upper edge of the spider-head forms a stop for the lug $d^3$ and prevents the lifting of the cover entirely from the top of the pole except when desired. On the upper face of the spider-head is also the recess $e^3$, in which the upper lug $d^2$ may rest and so support the cover in its raised position when access to the terminal is desired. It is evident that any suitable form of bayonet or like joint for supporting the cover can be employed, though that described is simple and therefore desirable.

In the regular use of such terminals the cable F is carried aboveground and up the pole into what is usually called a "pot-head" $f$, at which point proper connections of okonite or other waterproof covered wires are made to the wires in the cable, and the pot-head $f$ is covered by a sheet-metal collar $f'$, which fits neatly in the flanged hole $f^2$ of the disk $c$, connection being thus made to the inclosing case of the terminal without possibility of direct contact of moisture with the cable. The disk $c$ has also a series of openings $c'$, through which the insulated line-wires pass and from which they are carried out to the distributing-ring R, hereinafter described.

In addition to the spider-head $e$ above referred to I also employ a lower spider-head $g$, which is secured to the standard $b$, and the outer edges of both spider-heads are made angular, having four, five, six, or other number of faces thereon, as found desirable, the drawings showing spider-heads with six faces, as the distributing-terminal illustrated gives support for six distributing or terminal plates or strips with which the wires can be connected. The terminal-strips are formed of rubber or like insulating material and are supported in vertical position radially around the standard $b$, being rigidly secured to the spider-heads $e$ and $g$. Where, as in the regular distributing-terminal, it is desired to not only distribute the wires, but to provide fuse-supports for each individual wire in addition to the inner or cable-side terminal-strips $k$, secured directly to the spider-heads, I employ the outer or line-side terminal-strips $l$, which are substantially the same in construction and are supported on the elbow-arms $m$, the inner ends of which pass through the cable-line terminal-strips $k$ and secure them to the spider-heads, while they extend out in position to give support to the line-side terminal-strips $l$, as shown, elbow or bent arms being preferably employed in order to support the fuses $n$ in proper position. Secured to each cable-side terminal-strip $k$ are a series of sockets $k'$, passing through holes in the terminal-strip and secured thereto by nuts and holding under them the metal clips $k^2$, to which the wires on the cable side are secured. The sockets $k'$ have threaded holes formed in their outer faces into which are screwed the regular standard fuses $n$, the said fuses extending out radially or parallel with the elbow-arms $m$ and being connected to the forked clips $n'$, supported on the line-side terminal-strip $l$. It is preferred to employ this form of standard fuse; but any suitable form of fuse and proper connection for supporting the same may be employed. It is to be noted that the forked clips $n'$ are bolted by means of bolts and nuts $l'$ to the line-side terminal-strips and that they also have clip ends $n^2$, to which the wires on the line side may be connected, holes being formed in the ends of these clips as holes are formed in the ends of the clips $k^2$, to both of which wires can be soldered or otherwise connected, as desired. Either the cable-side or the line-side terminal-strip may of course be provided with the regular binding-posts, such as are illustrated in connection with the line-side strips $l$ to secure the clips $n'$ in place.

It will be noticed that the cable passes into the pot-head $f$, and from the same the insulated wires are carried within the casing through the opening $f^2$ of the disk $c$. At this point the wires are separated into bunches or branches 1 2 3 4 5 6, corresponding to the number of cable terminal-strips, and these branches are carried upwardly close to the standard, each one in line with the strip to which it is to be connected. The wires of each branch are of course carried as bridle-wires, and in the making of a regular connection the two bridle-wires 7 8 are separated and connected to adjoining clips, such as the two at the bottom of the cable-side terminal-strip $k$, and they are there soldered or otherwise connected to the clips $k^2$, and like bridle-wires 7 8 are connected up to the clips $n^2$ of the line-side terminal-strip $l$, and the insulated bridle-wires leading from such line-side strip pass thence down and out through one of the holes $c'$ in the disk $c$, and are thence carried to the distributing-ring hereinafter described. In this way all of the wires from the cable are carried up close to the standard, while all the wires leading out on the line side and to be distributed to points for use are carried in the outer portion of the terminal, so that easy access is obtained to both. At the same time the fuses are also so located that there is easy access to them, and in case of their burning out or becoming inoperative they can be quickly and easily changed. A very large number of connections can thus be made to the distributing-terminal, the only limit being the proper length for the box and the number of terminal-strips which can well be secured around the central standard.

In the use of such distributing-terminals it is of course necessary to provide both for the distributing of the wires therefrom and to give support to the operator in connecting up the wires to the terminal, and I am enabled to provide for both purposes by the employment of a large distributing-ring supported upon the pole below the distributing system as follows: At a suitable point below the top of the pole are bored two holes extending horizontally and centrally through the pole one above the other, the distance between the holes corresponding to the thickness of the distributing-ring R. Extending horizontally through the holes so bored in the pole are the tubes $r\ r'$, these tubes extending at right angles to each other, the one above and the other below the distributing-ring R, and the ring is connected by bolts $r^2$ to these tubes, resting on the top of the lower tube and connecting below the upper tube, so that a firm support for the ring is provided through these tubes, which is not only simple in construction, but overcomes the great difficulty of locating such a distributing-ring upon any telegraph-pole without the necessity of turning or finishing the pole and the body of the same above the ring to the exact size, which would be necessary if a hub fitting the pole were employed. This ring provides a seat for the workman, and as its extends around the pole provides such seat at any point where he may desire to obtain access to the terminal. To provide for the distribution of the wires from this distributing-ring R, holes are bored through the same at suitable intervals, and insulators $r^3$ are secured above and below the same by suitable bolts $r^4$, passing through the insulators and ring. The operator can seat himself on the top of the insulators. In order to keep open the spaces between the cross-arms $r\ r'$ the distributing-wires leading from the line-side terminals above described are carried first through the openings $c'$ in the disk, as above referred to, and are then carried through guide-loops $t$, secured to the pole in line with the cross-arms, and thence out through like guide-loops $t'$, secured to the bolts $r^2$ at the ends of the cross-arms, from which the insulated bridle-wires are carried to the insulators $r^3$, and thence distributed in any desired direction.

In the use of the above-described terminal after its erection on the top of the pole and the carrying of the cable into the pot-head the several bunches or branches, such as the branches 1 2 3 4 5 6, are carried from the pot-head close into the standards and in line with the cable-side terminal-strips $k$, the bridle-wires are separated, the connections made, as above described, to the clips $k^2$ on the cable-side strips, and the connections made to the clips $n^2$ on the line-side strips, and these wires are carried down close to these terminals and through the openings $c'$ in the disk $c$ and thence through the loops $t\ t'$ to the insulators, passing in their course in whatever direction desired. To make these connections or to search for faults or make repairs, the operator ascends the pole and passes in between the arms $r\ r'$ and supports himself upon the distributing-ring R, and he then raises the cover D, lifting it up until the upper stud $d^2$ catches against the top spider-head $e$, and turning the cover until he brings the stud into line with the keyway $e'$, and he then lifts the stud through the keyway and turns it so as to rest the stud in the seat $e^2$. This gives him access to the entire terminal system, and when he has made the necessary connections or repairs it is only necessary to turn the cover and bring the stud in line with the keyway and lower the cover over the terminal system. When brought back to place, the cover entirely incloses the terminal system, while the disk $c$ forms the bottom or base of the inclosing case, and the entire system is thus protected from the weather, the only wires exposed being those which are properly coated as they pass from the terminal downwardly and outwardly to the distributing-ring. It is also to be noted that in this arrangement the cable enters through the bottom into the inclosing case and the wires pass downwardly to the distributing-ring, all necessity for openings in the upper part of the inclosing case being overcome.

In case it is desired to make ground connections in the system above described this is easily provided for by means of a ground terminal-strip which may be secured to any one of the supporting elbow-arms—such, for example, as the strip E, which can be bolted to the elbow-arms—and any wires which it is desired to ground can be carried to such grounding-strip E and secured to suitable binding posts or clips thereon.

Where the invention is to be employed in connection with a small size of terminal, such as in connection with a junction-box, the same may be placed either on the top of the pole or at the side of the pole, as illustrated in Figs. 4, 5, 6, and 7, and the standard U, supporting the terminal-strips, can support any desired number of the same, such as shown in said figures, and where fuses are not to be employed the cable or incoming wires can be connected to clips or binding-posts, such as the binding-posts $u'$ on one side of the terminals $u$, the outgoing or line wires being connected to the clips or binding-posts $u^2$ on the other side of the terminal-strips, and for that purpose the terminal-strips may be supported some distance out from the central standard by means of bolts or arms $u^3$. Where a ground connection is to be made within the casing, a ground terminal-strip $v$ may be secured in like way directly to the central standard U by means of like arms and support the grounding-strip $v$, carring a suitable number of binding-posts $v'$, to which the wires can be connected, the grounding-wire $v^2$ leading thence to the lead covering of the cable, as shown. The disk $w$ has openings $w'$, through which the wires enter and through which they pass outwardly, and the cover W fits over the system and said disk $w$, the cover having a like central supporting-bar $w^2$, passing within the central standard U and held in place when raised by a spring-latch $w^3$, (see Fig. 8,) such parts being simply illustrative of different changes which may be made in such details.

Where the joint-box is to be supported on the side of the pole, a suitable bracket W' may be bolted thereto and extend out to give support to the central standard.

I am thus enabled to provide an exceedingly cheap, simple, and compact distributing-terminal which can be used both for distribution from underground or aerial cables and either for distribution of an entire cable or branches leading therefrom and in which the terminal is entirely inclosed and protected from the weather, while when it is opened easy access is obtained to any or all of the parts thereof for connection, inspection, or repair, and also provide for the distribution of the wires leading from the same in any direction desired without the necessity of carrying them first downwardly out of the inclosing casing, and thence upwardly to the ordinary cross-heads, and while providing for so distributing the wires I provide with the same proper rest or support for the operator when at work.

What I claim as my invention, and desire to secure by Letters Patent, is—

1. In a distributing electric terminal, the combination of a central supporting-standard, a series of inner cable terminal-strips supported by and arranged radially around the same, and a series of outer terminal-strips supported by arms extending out therefrom, substantially as set forth.

2. In a distributing electric terminal, the combination of a central supporting-standard, a series of inner terminal-strips supported by and arranged radially around the same, elbow-arms extending out therefrom, and outer terminal-strips supported by said elbow-arms.

3. In a distributing electric terminal, the combination of a central standard, a series of inner terminal-strips supported by and arranged radially around the same and extending out therefrom, outer terminal-strips supported thereby, a series of clips upon the inner terminal-strips, another series of clips upon the outer terminal-strips and fuses connecting such two series of clips, substantially as set forth.

4. In a distributing electric terminal, the combination of a central standard, a series of inner terminal-strips supported by and arranged radially around the same, elbow-arms extending out therefrom, outer terminal-strips supported by said elbow-arms, a series of clips supported by and extending back from the outer terminal-strips parallel with the elbow portions of said arms, and fuses supported by said clips, substantially as set forth.

5. In a distributing electric terminal, the combination of a central standard, a series of inner terminal-strips supported by and arranged radially around the same, arms extending out therefrom, and outer terminal-strips supported by said arms, clips on said terminal-strips and fuses connected to said clips, and a separate grounding-strip connected to and supported by one set of said arms, substantially as set forth.

6. In a distributing electric terminal, the combination of a base-piece, a terminal system having a series of terminal-strips supported above the same, and a vertically-adjustable case or cover inclosing the terminal system, substantially as set forth.

7. In a distributing electric terminal, the combination of a terminal system having a central hollow standard and a series of terminal-strips supported by and arranged radially around the same, and a vertically-adjustable inclosing cover having a central shaft extending into said hollow standard and inclosing the terminal system, substantially as set forth.

8. In a distributing electric terminal, the combination of a hollow central standard having a series of terminal-strips supported by and arranged radially around the same, a vertically-adjustable inclosing case or cover having a shaft fitting within said hollow standard, and a catch to hold said shaft and cover in raised position, substantially as set forth.

9. In a distributing electric terminal, the combination of a hollow central standard, and a series of terminal-strips supported by and arranged radially around the same, said standard having a head-piece at the upper end provided with a groove, and a vertically-adjustable inclosing case or cover having a central shaft passing into the hollow standard and provided with lugs, one adapted to pass through the groove of the head and rest upon the top thereof, and the other adapted to engage the under face of such head; substantially as set forth.

10. In a distributing electric terminal, the combination of a lower disk having openings for the passage of the cable or wires, a terminal system having a series of terminal-strips supported above the disk, and a vertically-adjustable cover inclosing said strips and extending down around said disk so as to inclose the terminal system, substantially as set forth.

11. In a distributing electric terminal, the combination of a lower disk having openings for the passage of the cable or wires, a terminal system having a central standard and a series of terminal-strips supported by and arranged radially around the standard, and a vertically-adjustable cover supported by said central standard and extending down around and below said disk, so as to inclose the same and the terminal system, substantially as set forth.

12. In a distributing electric terminal, the combination of a disk having openings therein for the passage of the cable or wires, a terminal system having a hollow central standard extending up from said disk, a series of terminal-strips supported by and arranged radially around the standard, and a vertically-adjustable cover having a central shaft entering the hollow standard, said case extending down to the disk so as to inclose the terminal system, substantially as set forth.

13. In a distributing electric terminal, the combination of a disk having openings therein for the passage of the cable or wires, a terminal system having a hollow central standard extending below and above said disk, a series of terminal-strips supported by and arranged radially around the same, and a vertically-adjustable cover extending around the terminal system and around and below said disk and having a central shaft entering said hollow central standard and passing below the disk, substantially as set forth.

14. In a distributing electric terminal, the combination of a telegraph-pole, a disk fitting on the top thereof, a hollow central standard extending into said pole and having a bracket fitting on and securing said disk in place, a series of terminal-strips supported by and arranged radially around the hollow central standard, and a cover inclosing the terminal system and fitting around and below said disk and having a central shaft entering said hollow standard, substantially as set forth.

15. In a distributing electric terminal, the combination of a telegraph-pole, a case or disk secured on the top thereof having an opening therein for the passage of the cable, a sleeve connected to and extending below said disk and fitting around the cable, a terminal system supported above the disk and a vertically-adjustable cover inclosing the terminal system, substantially as set forth.

16. In a distributing electric terminal, the combination with a telegraph-pole having a terminal system supported on the top thereof, of a distributing-ring supported on the pole below the top thereof and having a series of insulators arranged around the same, substantially as set forth.

17. In a distributing electric terminal, the combination with a telegraph-pole having a terminal system supported on the top thereof, and provided with a disk or base-plate of greater diameter than the pole, and having a series of openings therein, of a distributing-ring supported on the pole below the top thereof and having a series of insulators arranged around the same, substantially as set forth.

18. In a distributing electric terminal, the combination with a telegraph-pole having a terminal system supported on the top thereof provided with a disk or base-plate having a series of openings therein for the passage of the wires, of a distributing-ring supported by bars extending out from the pole and carrying a series of insulators and guide-loops in line with said bars for directing the wires in their course, substantially as set forth.

19. In a distributing electric terminal, the combination with a telegraph-pole having a terminal system supported on the top thereof provided with a disk or base-plate having a series of openings therein for the passage of the wires, of a distributing-ring supported by bars extending out from the pole and carrying a series of insulators, and a guide-loop supported on the pole, and a guide-loop supported on the distributing-ring for directing the course of the wires, substantially as set forth.

20. In a distributing electric terminal, the combination of a pole, a distributing-terminal supported on the top thereof, bars passing through said pole below the top thereof at right angles to each other and in different planes, and a distributing-ring connected to the top of one of said bars and to the bottom of the other and carrying a series of insulators, substantially as set forth.

In testimony whereof I, the said ROBERT S. DONALDSON, have hereunto set my hand.

R. S. DONALDSON.

Witnesses:
JOHN N. DUNN,
LINDSAY DE B. LITTLE.